(12) United States Patent
Nishioka

(10) Patent No.: US 6,379,253 B1
(45) Date of Patent: Apr. 30, 2002

(54) GAME DEVICE AND COMPUTER-READABLE STORAGE MEDIUM

(75) Inventor: Hidenori Nishioka, Sapporo (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/556,586

(22) Filed: Apr. 20, 2000

(30) Foreign Application Priority Data

Jun. 8, 1999 (JP) .......................................... 11-160448

(51) Int. Cl.$^7$ ........................... A63F 13/00; A63F 9/24; G06F 17/00; G06F 19/00
(52) U.S. Cl. ................................ 463/43; 463/1; 463/2; 463/23; 463/44; 273/148 B; 273/461; 700/90; 700/91; 700/92
(58) Field of Search .............................. 463/43, 44, 30, 463/31, 32, 33, 34, 23, 1, 2; 273/148 B, 460, 461; 700/90, 91, 92

(56) References Cited

U.S. PATENT DOCUMENTS

| | | | |
|---|---|---|---|
| 5,730,654 A | * | 3/1998 | Brown ....................... 463/1 X |
| 5,855,483 A | * | 1/1999 | Collins et al. .......... 434/322 X |
| 6,159,100 A | * | 12/2000 | Smith ....................... 463/42 X |
| 6,210,272 B1 | * | 4/2001 | Brown ....................... 463/1 X |
| 6,278,985 B1 | * | 8/2001 | Hatayama .................... 706/20 |
| 6,292,830 B1 | * | 9/2001 | Taylor et al. ................ 709/224 |

FOREIGN PATENT DOCUMENTS

JP          2-210562       8/1990

OTHER PUBLICATIONS

Beached II, version 1.4, by Marcus Boxall, Jun. 1, 1999.*
Abmis the Lion, Shareware, Oct. 9, 1997.*
Corpse Killer, by Digital Pictures, 1994.*
Ocean Bound, version 1.1 by Spiderweb Software, Sep. 16, 1998.*
Food Chain by Cajun Games, Sep. 10, 1998.*
Beached, v. 1.3 by Marcus Boxall, Apr. 8, 1999.*
Life on Mars, v.1.11 by AWorld Shareware.*
Save the Earth: The First Adventure, v. 1.1 by Arvin, May 14, 1998.*

* cited by examiner

Primary Examiner—Joe H. Cheng
Assistant Examiner—Binh-An D. Nguyen
(74) Attorney, Agent, or Firm—Sughrue Mion, PLLC

(57) ABSTRACT

A game device which plays a game in which a player manipulates a character compelled to live in an uninhibited island alone, and through the game, the player experiences virtual actions relating to a matter of life and death to acquire knowledge to survive. The player instructs the character in the game to create a new tool to get the food and to eat the food. A state of health of the character varies similarly to the real world, according to whether the character eats the food or not and how the character eats it.

27 Claims, 5 Drawing Sheets

GAME DEVICE AND COMPUTER-READABLE STORAGE MEDIUM

BACKGROUND OF THE INVENTION

1. Field of the Invention

The invention relates to a game device and a storage medium which can let a player enjoy an adventure game.

2. Description of the Related Art

Nowadays, there are various games, such as a simulation game, a role-playing game, a combat game, a puzzle game, and the like, each of which can play by using a game device including a display device and a controller. A wide variety of requests to these games have been made from consumers over a wide range.

Among the above-mentioned games, the role-playing game can virtually let a player experience a lot of adventures in an unusual manner that is completely different from real life. A large number of such role-playing games have been proposed and have a great number of fans or maniacs for each game.

Most of these role-playing game, however, are restricted to specific users or maniacs because such games often include too violent, sensational, or too cruel scenes. In an educational point of view, the games are not always suitable for young persons, such as elementary school children.

On the other hand, as urbanization progresses, the school children have lost opportunity for touching a natural product, and experiencing or learning in the nature. Thereby, the children can not effectively cope with occurrence of an emergency, such as a natural disaster.

In such circumstances, it may be helpful for the children to see what to do alone when an emergency arises through a play of the games. Also, one of conditions necessary to live alone is to keep some foods. It might be very important to understand these necessary conditions to live alone by playing the games before occurrence of a real emergency.

Today, it is difficult to assume that a child should seek foods and cook the foods alone in everyday life. Therefore, if a game can virtually cause a disaster to occur and let a player find how to live alone in a place which is isolated from the outside world due to the disaster, the game may be not only more interesting, but also advantageous in an educational point of view.

SUMMARY OF THE INVENTION

Therefore, it is an object of the invention to provide a game device which plays a survival game which can virtually experience a matter of life and death and which is effective in educating a young person.

It is another object of the invention to provide a game device which plays a survival game which can mainly acquire knowledge of foods.

It is a further object of the invention to provide a game device which play a survival game which takes into account a relationship between change of an intake of foods with time and an influence to human health.

It is a still further object of the invention to provide a game device which plays a survival game which makes a player understand the difference between cooking of an animal and cooking of a plant, and a relationship between the difference and an influence to human health.

It is a still further object of the invention to provide a computer-readable storage medium which stores a program of the above-mentioned games.

According to a first aspect of the invention, there is provided a game device which is capable of playing a game in which a player manipulate a character and make the player experience virtual actions relating to a matter of life and death in connection to the character, and the game device comprises parameters which influences upon the matter of life and death and a control unit which increases or decreases values of the parameters with lapse of time in a game space.

According to a second aspect of the invention, there is provided a game device which is capable of playing a game in which a player manipulates a character, and the character lives in an inhabited island alone with acquiring knowledge to survive, and the game device comprises a plurality of images each of which represents a food, a command which instructs to pick up the food, a storage unit which stores a time when the food is picked up, a first control unit which when a time the character eats the food a predetermined time later from the stored time, changes a state of the food, and a second control unit which associates the state of the food with a state of health of the character According to a third aspect of the invention, there is provided a game device which is capable of playing a game in which a player manipulates a character, and the character lives in an inhabited island alone with acquiring knowledge to survive, and the game device comprises a plurality of images each of which represents a food, a first command which instructs to pick up the food, and a second command which instructs to process the food, wherein selecting of the first and the second commands is associated with a state of health of the character.

According to a fourth aspect of the invention, there is provided a recording medium readable by a computer, tangibly embodying a program of instructions executable by the computer to play a game in which a player manipulates a main character, and the character lives in an inhabited island alone with acquiring knowledge to survive, and the program comprises the steps of storing a plurality of images each of which represents a food, preparing a command which instructs to pick up the food, storing a time when the food is picked up, changing a state of the food when the character eats a food a predetermined time later from the stored time, and associating the state of the food with a state of health of the character.

According to a fifth aspect of the invention, there is provided a recording medium readable by a computer, tangibly embodying a program of instructions executable by the computer to play a game in which a player manipulates a character and, through the game, the player experiences virtual actions relating to a matter of life and death in connection to the character, and the program comprises the steps of preparing parameters which influences upon the matter of life and death, and increasing or decreasing values of the parameters as time in a game space goes by.

DESCRIPTION OF THE PREFERRED EMBODIMENT

Figure 1:
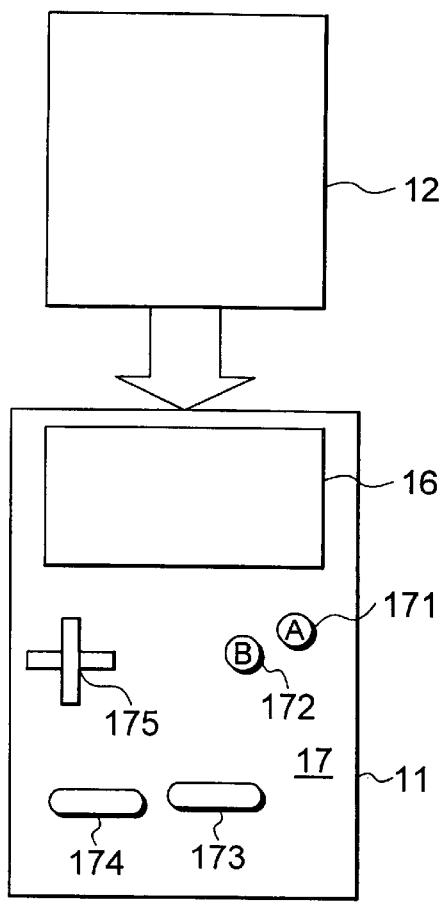
FIG. 1 shows a hand held type game device which plays a survival game of the invention.

Referring to FIG. 1, description is at first made about a game device which plays and enjoys a survival game according to the invention. As the game device, a hand held type game device 11 which is widely sold is exemplified in FIG. 1 and will be simply called a game device. However, the game device may not be restricted to the hand held type game device but any other devices, such as an arcade machine, a computer, than the hand held game device.

In order to enjoy the survival game, it is assumed that a game player sets, into the game device, a cassette which stores a program of the survival game. In this situation, an image of the survival game is visibly displayed on a display part 16 of the game device 11.

As well known, the display part 16 of the illustrated game device 11 is formed by an LCD (liquid crystal display) panel and displays game images. In addition, the game device 11 has a control part 17 which is operable to control operations of a main character displayed in the display part 16.

On the control part 17, a plurality of buttons are arranged to be operated or manipulated by a game user during playing the survival game. Specifically, a button A 171, a button B 172, a start button 173, a select button 174, and a cross button are located on the illustrated control part 17.

Now, in the survival game of the invention, a main character of the game is displayed as a main character image on the display part 16 together with a background image of the main character image. The main character image and the background image appear on a field screen. Messages, such as commands, items, and the like are also displayed as message information in a window screen of the part 16.

In a predetermined area of the field screen, such as the lower part of the field screen, information related to health of the main character is displayed as health information. The health information includes, for example, life points representing life force of the main character, namely ability to survive, a degree of fullness, an intake of water, and a degree of tiredness. Further, states of the character's health and psychology are displayed in the lower part as numeric information. Still further, a mark in the field screen indicates either one of morning, moon, and night.

The start button 173 is used to open or close the window screen during execution of the survival game of the invention. The button A 171 and the button B 172 are used to direct the main character in the field screen to take necessary action and are also used to decide/cancel commands in the window screen. The cross button 175 is used to move the main character and a cursor.

As described above, the game player selects one of commands designated by a program stored in the cassette by means of operating the buttons on the control part 17 in response to change in the field screen and the window screen. As a result, the main character can be moved in the field screen as required. The player can enjoy the survival game by directing the main character to take action according to the circumstances. The game proceeds based on the program stored in the cassette 12 which is set into the game device 11.

Figure 2:
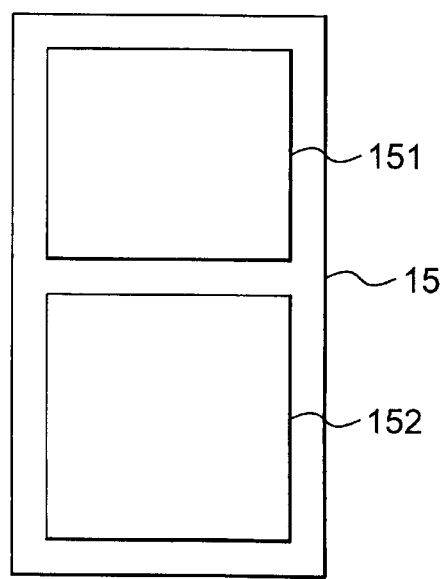
FIG. 2 shows a configuration of a computer-readable storage medium of the invention.

Herein, schematic description is made with reference to FIG. 2 about a storage medium 15 housed in the cassette 12. The storage medium 15 shown in FIG. 2 includes a ROM (Read Only Memory) which consists of a semiconductor memory in the illustrated example. Further, the storage medium 15 includes an instruction area 151 which stores commands for executing the program of the survival game and a data area 152 which stores a variety of data used in the survival game.

Figure 3:
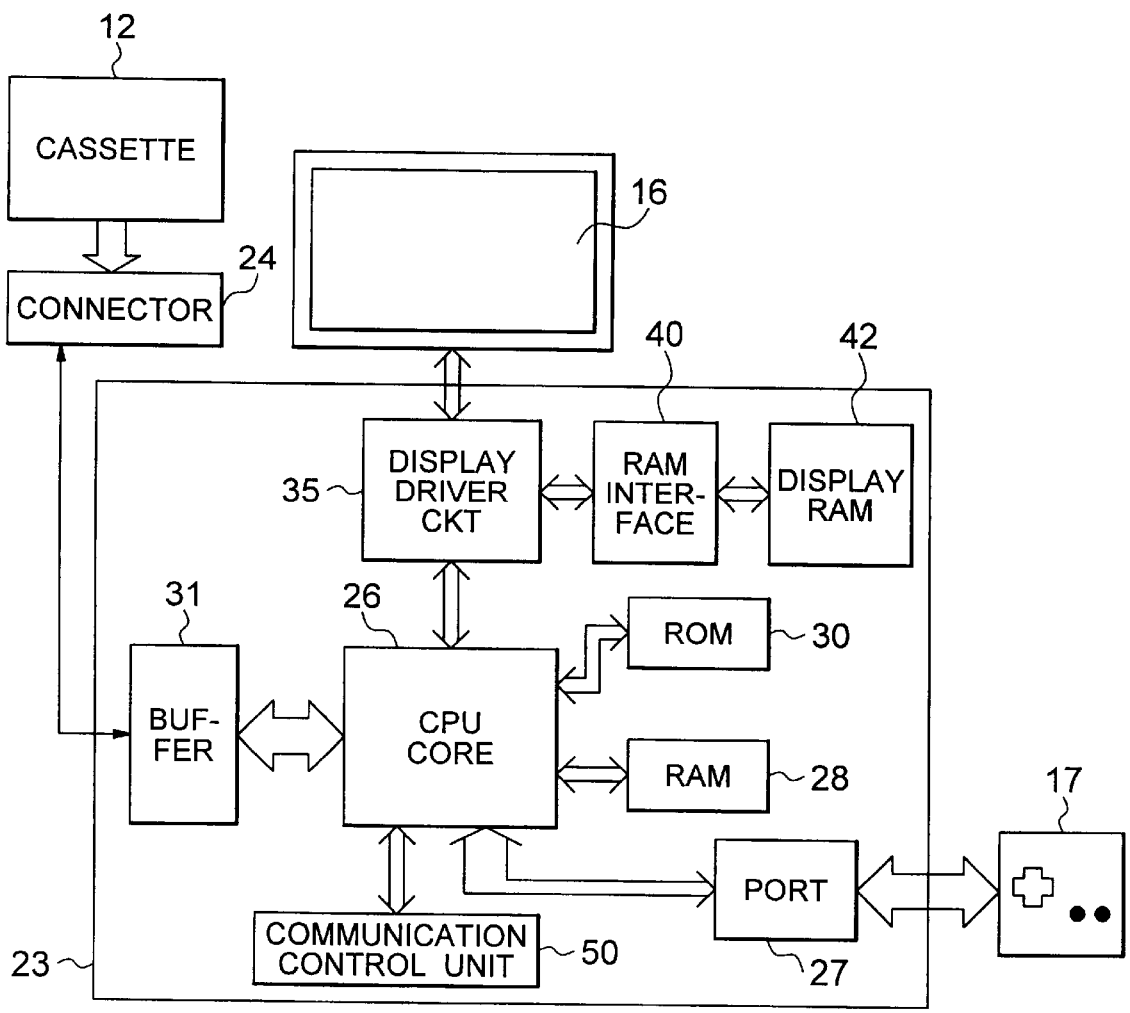
FIG. 3 shows a block diagram of the hand held type game device of the invention.

Next, description is made with reference to FIG. 3 about an internal structure of the game device 11 which is capable of executing the survival game of the invention by connecting the cassette 12 shown in FIG. 1 to the game device 11. The game device 11 shown in FIG. 3 includes, along with the display part 16 and the control part 17, and a main body (including CPU) 23 as disclosed in Japanese Laid Open Publication No. H02-210562 (namely, 210562/1990). Herein, the display part 16 may be structured by an LCD device which can provide color images. The control part 17 includes similar buttons as shown in FIG. 1.

The cassette 12 including the storage medium 15 shown in FIG. 2 is set to the main body 23 via a connector 24. As shown in FIG. 3, the main body 23 includes a CPU core 26, a port 27 located between the CPU core 26 and the control part 17, a RAM 28 connected to the CPU core 26, and a ROM 30 connected to the CPU core 26. Further, the CPU core 26 is connected to a buffer 31 used for timing adjustment and address and data storing, and is connected to a connector 24 via a bus. Also, a display driver circuit 35 is placed between the CPU core 26 and the display part 16. Furthermore, the display driver circuit 35 is connected to a display RAM 42 which stores images of characters to be displayed on the display part 16 via a display RAM interface 40. The ROM 30 stores an OS program which controls the display part 16, the display driver circuit 35, a communication control part, and the like.

The cassette 12 storing the program of the survival game according to the invention is connected to the body 23 of the game device 11 via the connector 24.

If electric power is turned on or reset operation is indicated by the player, the CPU core 26 initiates the OS program stored in the ROM 30 and initializes the whole of the game device. Then, at least a part of the survival game program and data used by the program are stored into the display RAM 42 or the RAM 28 which serves as a main memory.

Herein, when a player manipulates the control part 17, the CPU core 26 executes the survival game, and provides displays on the display part 16 in accordance with display data including a set of screens and a series of commands issued in response to player's manipulation.

Specifically, according to the players directions, the CPU core 26 makes access to the display RAM 42 via the display RAM interface 40, reads outs image data of a character in the display data from the display RAM 42, and displays the image data on the display part 16 via the display driver circuit 35.

Next, description is schematically made about a story of the survival game according to the invention so as to facilitate understanding of the invention. Before the survival game is started, the player should select a boy or a girl as a main character. Herein, a boy is assumed to be selected as the main character in the survival game for convenience of the description. It is also assumed that the selected main character is ten years old and voyages with his father on a passenger boat.

The survival game starts under the above-mentioned circumstance. Then, the main character, namely, the boy is given from his father a knife as a souvenir of the voyage on the passenger boat and keeps the knife in his rucksack. In the rucksack, a radio and some matchsticks preparing for the worst are also held.

One day, the sea suddenly becomes rough and the passenger boat is swallowed by the billow, in a flash, and the boat sinks into the sea. He is thrown out of the boat when the boat went into the sea, and was washed up on an uninhabited island with no consciousness. Then, he became conscious and found his rucksack and a water bottle. And he also found that he was alone. Further, he found the wreckage of the sunk boat, thereby recognizes that the boat sank away.

In this situation, if he satisfies a predetermined condition, he can listen to the radio in the rucksack and knows through the radio that searching for survivors has been continued. More particularly, to listen to the radio, he (player) should seek out an electric battery used for the radio on the field screen and combine the radio with the battery by carrying out a composing operation (will be described later). Further, it is not always possible to know the searching for survivors even by merely combining the radio with the battery, since radio broadcasting is done through many channels. In this game, if he can not know of searching for survivors within the day when the radio and the battery are combined, broadcasting on the next day is made about abandonment of the searching for survivors.

If he could see that the searching for survivors has been carried out, the story may be brought to an end by executing an event such that he is saved by a search party. In this case, he takes predetermined action of, for example, putting words "SOS" on a predetermined area in the field screen.

On the other hand, if he is not saved by the search party, he is forced to be alive in the uninhabited island in a manner of self-sufficiency and is puts into a situation where he should escape from the is land by himself. Therefore, he searches for some areas in the island and finds a cabin which is capable of keeping items, such as his rucksack, and being used for his rest. Further, he also finds during his searching a rest area suitable for taking a rest and encounters with a variety of animals and plants. Still further, he can pick up some items in the island and keep it. Alternatively, he can use it at the place where the item is picked up.

Such items may be, for example, a stone, a wood stick, an ivy, or a bark. Herein, the animals may include not only a land animal but also animals in the water, for example, a fish, a shellfish, and the like. He can survive by gathering eatable animals (for example, a hare, a frog, a fish, a shellfish, and the like) and eatable plants (for example, a nut, wild herbs, fruits, a mushroom, and the like) among the animals and plants in the island. The eatable plants are named such as "fluffy mushroom". Eating the plants brings about different influences due to the differences of the plant names. The main character (he) has a life point representing his life force and the above survival life can be continued until the value of the life point becomes zero.

In the survival game, animals, such as a bear, a snake, and a scorpion, appear, but these animals may make a counterattack to him, or injure him by using, for example, a poison to influence his life (that is, life point). Further, the above eatable plants may injure him (for example, food poisoning), when he eats the plants with no processing or cooking. Therefore, he should judge whether or not animals injure him and whether or not the animals attach him. Also, since the eatable animals may cause food poisoning to him when he eat the animals without any cooking, a piece of meat obtained by hunting should be processed or cooked (for example, roasted).

As described above, to roast the piece of meat, he should make a fire. Herein, he thinks of using the matchsticks, but the matchsticks are not available because they get wet in a seawater. As a result, he must assemble a tool to make a fire. In the game, in response to selection of the player, he can assemble a primitive tool to make a fire by combining a bark with a wood stick. Such a primitive tool is mentioned as an example of the items.

In addition, a bow and arrow, a fishing rod, and the like can be assembled in the survival game by combining a plurality of items based on instructions of the player. At any rate, a tool for hunting animals or a tool for fishing can be obtained in the survival game according to the invention.

On the other hand, a piece of meat of animals obtained by the hunting or fishes caught by fishing will rot with lapse of time just like the real life. Taking the real life into account, when he eats a piece of meat of animals which is left unprocessed for a predetermined period, he suffers from food poisoning and is put into unhealthy state. To avoid rot of the piece of meat, he will find from his experience that he can keep the meat so that the meat is available for a long term similarly to the real life by roasting the meat, and sprinkling spice picked up among plants on the meat. That is, he can find from experience in the game that an intake of the rotted meat leads to food poisoning and that it is able to keep the meat for a long time by sprinkling spice on the meat.

Similarly, plants picked up by him are not always eatable and there may be a plant that causes food poisoning to occur. Further, there may be a plant that leads to paralysis or confusion. On the contrary, there also may be a plant that improves a state of health, that is, increases his life point. For example, a mushroom picked up by him is not always harmless, when he eats the mushroom and he may suffer from food poisoning or paralysis. Such influence of the spice or the mushroom (harmless or not) can be determined by the names of the plants (for example, a "soft mushroom"). A relationship between a name of a plant and an influence resulting from the plant is randomly set at initialization of the survival game. Therefore, the relationship is not changed as far as a single game continues, but when the game is restarted, a plant can have different influence from the previous play, even when the plant is given the same name. This shows that it is not uniquely determined whether or not a plant is harmful only on the basis of its name.

In the real life, once plants are picked up, they can not be harvested for a period. Similarly, in the game, once plants are picked up by him, they can not be harvested again for some days.

As mentioned above, animals and plants which are got by hunting, fishing, or picking up cause a state transition to occur with time in the real life. In the survival game of the invention, such a state transition is incorporated into the game as element of the game story. Thereby, he can undergo an experience in the game like the real life.

Also, lapse of the time in the game is related to various terms or parameters that influence the life of the main character and each of which is associated with his action. For example, each of the parameters may be concerned with the number of his steps and, in this case, as his action become frequent (as the number of his steps is increased), it is judged that a long time elapses. Therefore, when he acts lively for a long time, each parameter related to his survival is decreased. Since a lapse of time in the game is proportional to a distance of his movement instructed by the player, the player should give an instruction under careful consideration.

As described above, he can survive for as many days as possible in the game by eating animals and plants, and drinking water. In the other words, the player can play the game until his life point becomes zero. If he continues to act without eating food, a degree of fullness is decreased and his life point is also reduced. Similarly, if he continues to act without drinking any water, a degree of water shortage is reduced and his life point goes down. Further, his life point is reduced due to an increase of a degree of his tiredness resulting from his action. The degree of his tiredness can be recuperated by taking a rest. Likewise, the degree of fullness and the degree of water shortage are recovered by taking foods and water.

As described above, the degree of fullness, the intake of water, and the degree of tiredness are used in the game as elements (parameters) on which his (the main character's) life depends. When one of these parameters reaches a predetermined limit value and then he still takes action, his life point is reduced.

In the game, when he has food poisoning by eating the rotted meat of animal or a poisonous mushroom, his life point is also reduced. On the other hand, when he eats a predetermined food, his life point may be improved.

In the meanwhile, it is to be noted that he can explore in the uninhabited island, undergo various adventures other than intake, and even try to produce a raft and to escape from the island. In any way, a variety of endings of story in the game are prepared according to the player's selection. For example, he consequently escapes from the island, settles in the island, or the like. However, in any endings, he can hardly expect corporation of the other people.

Figure 4:
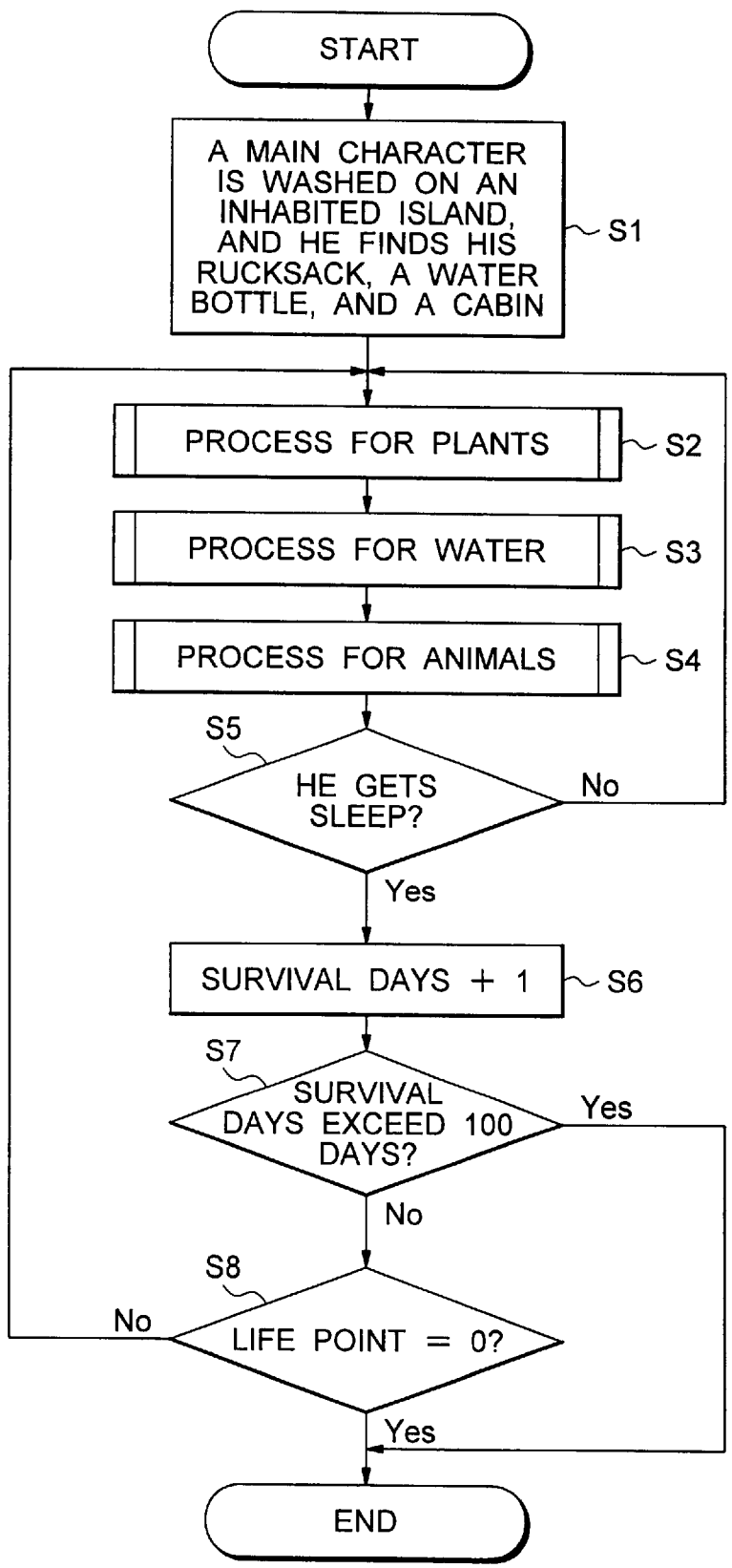
FIG. 4 shows a flowchart representing the survival game of the invention.

Referring to FIG. 4, description will be made about processing foods and water in the survival game.

Figure 5:
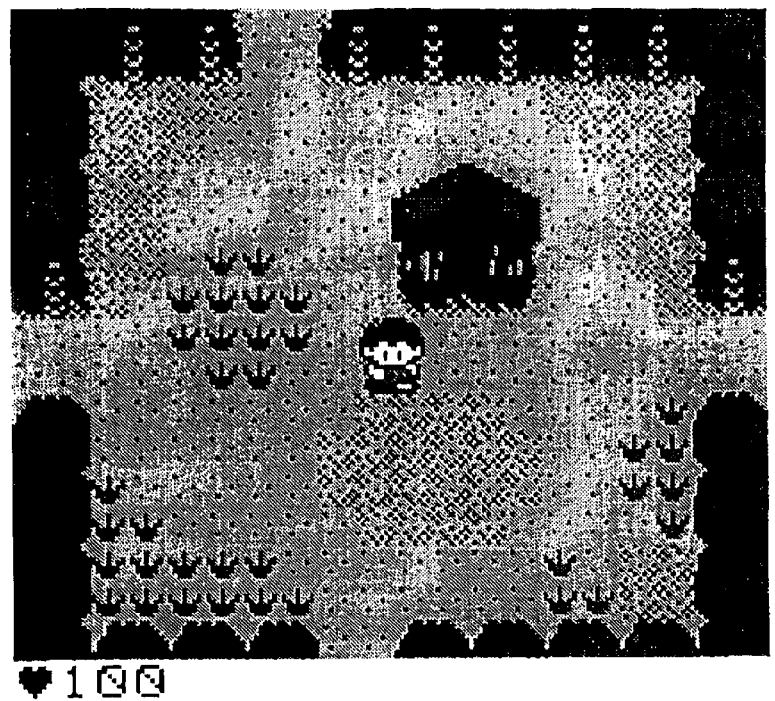
FIG. 5 shows a cabin represented in a field screen.

In FIG. 4, a main character (he) is at first washed up on a shore of an uninhabited island. It is assumed to he finds his rucksack, a water bottle, and a cabin in which he can live for the time being (step S1). In this situation, as shown in FIG. 5, a background image including the cabin is displayed in the field screen on the display part 16. This means that various field screens are rendered and stored from the cassette 12 to the display RAM 42 in the game device shown in FIG. 3. Then he goes into the cabin in response to manipulation of the cross button 175 by the player. When he resides in the cabin and then the player pushes the start button 173, the presently displayed screen is changed to the window screen (as shown in FIG. 7).

Figure 7:
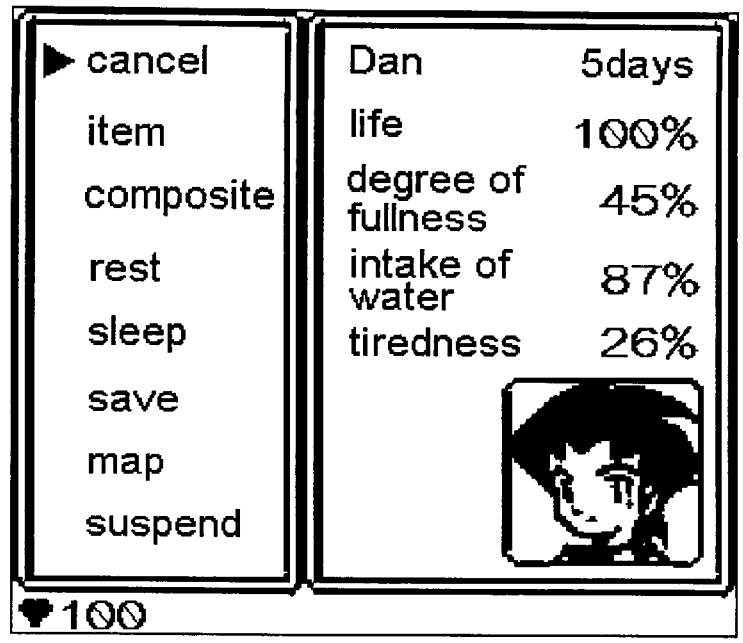
FIG. 7 shows a window screen of the field screen of the invention.

Temporarily referring to FIG. 7, the window screen displays his name, survival days, life point, a degree of fullness, a degree of water shortage, and a degree of tiredness are displayed within the window screens. Further, in the same window screen, actions to be selected and to be done in the future by him, "item", and the like are displayed. The actions are displayed and indicated in the form of, for example, "rest", "composite", "sleep", "cancel", and the like. At this point, if "item" is selected, he can take out/return an item from/to a set of items in the cabin. If "cancel" is selected, the display returns back to the previous window representing inside of the cabin.

Figure 6:
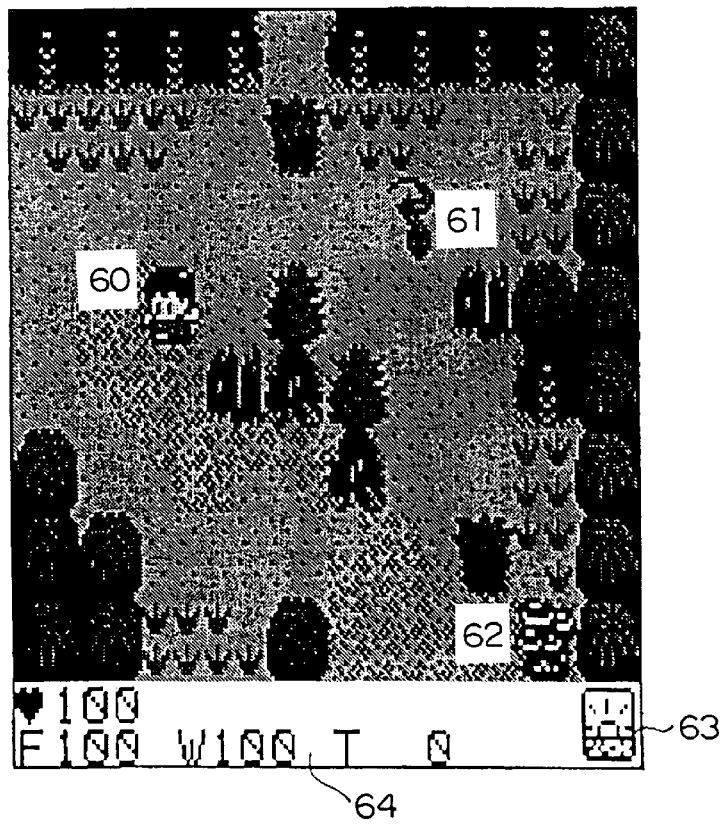
FIG. 6 shows an example of the field screen of the invention.

Now, for the sake of simplifying description, it is assumed that when "start" is selected, a field window as shown in FIG. 6 is displayed on the display part 16. In the field screen, the main character 60 (in this example, a boy) which is selected by the player, an animal 61 (in this example, a snake), and a plant 62 (in this example, a mushroom) are displayed.

In the lower part 64 of the field screen, a life point which is represented in figure after a heart-shaped mark, a degree of fullness which is represented in figure and is depicted by "F", an intake of water which is represented in figure and depicted by "W", and a degree of tiredness or tiredness (depicted by "T") which is represented in figure are displayed as parameters of the main character. In this example, values of the life point, the degree of fullness (F), the intake of water (W), and the degree of tiredness (T) are equal to 100, 100, 100, and zero, respectively. In the lower part 64, time is also displayed by an icon 63 to indicate whether the present time is morning, daytime, evening, or night. In this example, it is found that the present time is morning.

Next, in the field screen, he searches for foods and finds a mushroom at this point. And he picks up the mushroom and plants are cooked (step S2). Also, he can defeat an animal, such as the snake 61, but he may be attacked by the animal. When he can not find any foods in the field screen, he can walk to the other fields one after another and searches foods in response to the player's instruction. Due to such actions, the degree of fullness F and the intake of water W are decreased and the degree of tiredness T is increased. As a result, when any of the degree of fullness F, the intake of water W, and the degree of tiredness T reaches its limit point (in this case, zero % for the degree of fullness F and the intake of water W, 100% for the degree of tiredness T), his life point is decreased. For example, in FIG. 6, values of the life point, the degree of fullness, and the intake of water are 100% and value of the degree of tiredness is zero %. But after that, since he walks across a plurality of field screens, the degree of tiredness will be increased and the degree of fullness F and the intake of water W will be increased (not shown). As the degree of tiredness or tiredness T, the degree of fullness F, and the intake of water becomes closer to its respective limit point, his life point falls from 100. Practically, when the life point becomes equal to zero, the game will be over. When he has food poisoning, his life point is directly decreased.

In step S2 of processing plants, when mushrooms are once harvested at a certain position in the illustrated field screen, any mushrooms are not displayed at the position for a predetermined period determined in the game. Incidentally, plants picked up in the field screen can be eaten as they are.

In the process for plants in step S2, he should determine from his experience whether or not the obtained plants such as mushrooms, nuts, or herbs are toxic and whether or not the plants cause confusion or paralysis to occur. Subsequently, he should determine whether he can eat the plants or not. For example, when he eats a harmful plant, his life point is decreased as described above. Then, he should searches a herb having antidotal effect or takes predetermined actions to cancel the intake of poison. As mentioned before, when he takes some actions to search or the like, his life point will be further inevitably decreased. In any case, in the process for plants, he can harvest plants by changing from the field screen to the window screen and by selecting a command instructing to harvest plants.

In step S3, process concerned with water is executed. In such water processing, he not only keeps water required for him by scooping water into the water bottle when he finds a lake or a river, but also catches fishes when he finds them in the lake or the river. To catch the fishes, a fishing tool such as a fishing rod is required.

In the field screen including an image of a lake or a river, when the player pushes the start button 173, the field screen is changed to the window screen shown in FIG. 7. The left side of the window screen shows commands to be selected by the player, and the right side of the window screen shows the name of the main character selected by the player "Dan", and his present state. In this example, the present state is shown by four elements, that is, survival days (five days), a life point (100%), a degree of fullness (45%), an intake of water (87%), and a degree of tiredness (26%). Furthermore, in the lower part of the window screen, instructions are shown which can be selected by the player.

Next, description is made about transition from the window screen (as shown in FIG. 7) to fishing event. In the window screen shown in FIG. 7, commands including "item", "composite", "map", "suspend" and the like are displayed. The player can select one of the commands. When the player selects "item" command by moving cursor and pushing the button A, the window screen is changed to another screen showing a list of items which the player possesses. On the other hand, when the player selects "map" command, the window screen is changed to a screen showing a map including a place where the main character is staying. When "suspend" command is selected, the survival game is suspended on the way.

Figure 8:
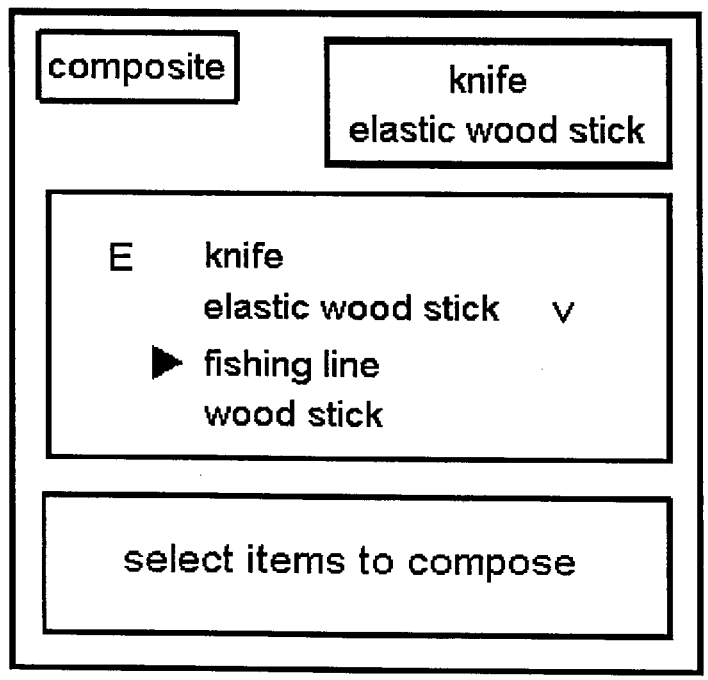
FIG. 8 shows an example of a composite screen of the invention.

When the fishing event is started, the player selects "composite" command in the window screen shown in FIG. 7. When the player selects the command as above, a window screen (composite window) is displayed as shown in FIG. 8 and shows items the player presently possesses. The composite window shows a plurality of items. In the example illustrated in FIG. 8, "elastic wood stick" and "fishing line" are selected by the player. Also, FIG. 8 shows that a checked item "elastic wood stick" has already been selected by the player and the cursor presently resides on "fishing line" item.

As set forth above, the illustrated player possesses "fish hook" item in addition to the two items "elastic wood stick" and "fishing line" as items required for producing a fishing tool. In this event, the player can produce a new item "fishing tool" by selecting the above three items "elastic wood stick", "fishing line", and "fish hook" through use of the cursor and by composing the items.

Returning back to FIG. 4, a process for hunting animals starts (step S4) after the process for water (step S3) ends. That is, a command for hunting animals is selected in the window screen.

In step S4, at first, a field screen is displayed and the player searches for an animal for food, for example, a rabbit, a frog, a boar, a bear, a raccoon, and a mole in the screen. Some animals can be caught without any tools, but other animals, for example, a bear or a boar can not be caught without any hunting tools. When the player tries to hunt the animals that can not be caught without tools, his life point may be reduced. Therefore, when he encounters with the animals, if he escapes from the animal, his life point can be maintained to some extent. However, since the degree of fullness and the intake of water are reduced and the degree of tiredness is increased due to the escape and no foods, his life point is consequently reduced. Further, also when he is pierced or bitten by a poisonous animal such as a scorpion or a snake, his life point may be reduced. In this case, when he has a medicinal herb, his life point may be recovered.

Therefore, he is required to prepare a tool, such as a bow and arrow, for encounter with an animal that can not be caught without a hunting tool. On provision of the bow and arrow, the player changes to the window screen as shown in FIG. 7, in a manner similar to the above case of producing the fishing tool. Specifically, the player selects "composite" command, and determines whether there are materials required to produce the bow and arrow, for example, "elastic wood stick", "ivy", and "arrow" in his own items he presently possesses. If he possesses these materials, the player selects the items on the window screen by using the cursor. Thereby, the main character can produce the bow and arrow required for hunting.

Since he gets the bow and arrow which is capable of hunting an animal, he can defeat an animal which can not be caught without a hunting tool, for example, a boar or a bear, using the bow and arrow.

In any way, animals which are caught or hunted by him are displayed on the field screen when the animals are caught. But, if he eats the obtained animal raw, this game is featured by causing the main character to suffer from food poisoning. As a result, his life point will be reduced.

To avoid food poisoning, it is required to roast a piece of meat of the animal. To roast the meat, it is further required to produce a tool for firing and to heat the meat. As mentioned above, in the survival game, matchsticks are all unavailable, he must produce the firing tool. Then, he should prepare items for the tool, that is, a wood stick and wood board. Here, the player changes from the field screen to the window screen and selects "composite" again. Then, if there are a wood stick and a wood board among a group of his own items, the player produces the firing tool by composing the items "wood stick" and "wood board" by using the "composite" command.

On the other hand, foods, such as meat, fish, or shellfish grow corrupt similarly to the real world, and if the foods are left as they are, he can not eat the foods. To prevent the foods from corrupting, it is required to roast the foods with spices (plants) to produce preserved foods. Such processes are also accomplished in the real world. Taking this into consideration, in this game, it is possible to produce the preserved foods by roasting the foods, such as meat, fish, and shellfish, with spices by the use of the firing tool. Therefore, this game requires to assemble the firing tool and to produce the preserved foods like in the real life.

As mentioned above, in the process for animals, he should do various works or actions such as producing a tool, roasting meat, searching plants for use as spices, and the like. Such the works and actions decrease the degree of fullness and the intake of water, and increase the degree of tiredness, which results in a reduction of his life point. Thus, he is required to get a food in a proper timing.

In FIG. 4, when the process for animals (step S4) ends, it is determined whether he gets sleep or not in step S5. If he does not get sleep, the above steps S2 through S4 are executed and, otherwise, the number of survival days is extended by one day in step S6.

Thereafter, in step S7, it is determined whether the number of survival days exceeds 100 days or not. If the survival days exceed, the game will be over. But, otherwise, it is also determined whether the life point reaches zero or not in step S8. If the life point is zero, the game will be over. Otherwise, the game is continued to repeat steps from step S2.

Herein, description is made about a relationship between the life point and the other parameters including "degree of fullness", "intake of water", "degree of tiredness". For example, in the case where the degree of fullness or the intake of water is zero %, or the degree of tiredness is 100%, if the main character (he) takes action more than a predetermined level, for example, walks more than four steps, the life point goes down from 100%.

Also, in the case where the degree of fullness or the intake of water is zero %, and the degree of tiredness is 100%, if he takes action more than a predetermined level, the life point exceedingly goes down.

In the case where the degree of fullness and the intake of water are zero %, and the degree of tiredness is 100%, if he takes action more than a predetermined level, the life point is drastically lowered.

Thus, in the survival game according to an embodiment of the invention, the life point is determined on the basis of parameters "degree of fullness", "intake of water", and "degree of tiredness". In this case, limit values of the parameters "degree of fullness", "intake of water", and "degree of tiredness" are determined as 0%, 0%, 100%, respectively. But, the other limit values may be used. Furthermore, the other parameters may be used.

As described above, according to the invention, a survival game device and a computer-readable storage medium can execute the program stored in the storage medium in the above-mentioned manner. In this game, a method of processing foods influences on the main character and, thereby, the player can experience phenomena or events which are close to the real world. Also, the game has superior educational effect.

Further, the player can acquire knowledge of tools required in an emergency by producing tools for catching land animals, fish, and the like.

What is claimed is:

1. A game device which is capable of playing a game in which a player manipulate a character and make the player experience virtual actions relating to a matter of life and death in connection to the character, the game device comprising:

parameters which influences upon the matter of life and death; and a control unit which increases or decreases values of the parameters with lapse of time in a game space, wherein the control unit further increases or decreases the value of the parameters in response to actions of the character and the parameters comprise a first group parameters including a degree of fullness of the character, an intake of water, and a degree of tiredness.

2. The game device of claim 1, wherein when at least one parameter of the first group parameters reaches to a predetermined limit value, a life point which represents a state relating to the matter of life and death is reduced.

3. The game device of claim 2, wherein the limit values about the parameters representing the degree of fullness of the character's stomach and the intake of water are set to zero, and the limit value of the parameter representing the degree of tiredness is set to 100.

4. The game device which is capable of playing a game in which a player manipulates a character, and the character lives in an inhabited island alone with acquiring knowledge to survive, the game device comprising:

a plurality of images each of which represents a food;

a command which instructs to pick up the food;

a storage unit which stores a time when the food is picked up;

a first control unit which when a time the character eats the food a predetermined time later from the stored time, changes a state of the food; and a second control unit which associates the state of the food with a state of health of the character.

5. The game device of claim 4, further comprising:

a plurality of individual items; and a composing unit which composes a new item used for the game by combining the items.

6. The game device of claim 5, wherein the new item is an item to process the foods or to pick up the foods.

7. The game device of claim 6, wherein the foods include animals, images representing the animals are prepared, and the new item is an item relating to hunting of the animals.

8. The game device of claim 7, wherein the new item is a processing item to process a piece of meat of the animal, and the state of health of the main character varies according to whether the item is used or not.

9. The game device of claim 8, further comprising a processing command instructing to roast the piece of meat of the animal with the processing item.

10. The game device of claim 9, wherein when the main character eats the meat without selecting of the processing command by the player, an index representing the state of health of the character is reduced.

11. The game device of claim 8, wherein the piece of meat of the animal is rotted as time elapses, and when the character eats the rotted meat, the index representing the state of health of the character is reduced.

12. The game device of claim 8, wherein the processing item is a firing item to fire used for roasting the piece of meat of the animal.

13. The game device of claim 4, wherein the foods include plants, images representing the plants are prepared, and the command that instructs to pick up the foods is a command to pick up the plants.

14. The game device of claim 13, wherein influence of the picked up plants upon the state of health of the character in the game is randomly determined at the start point of the game.

15. The game device of claim 13, wherein the plant which is picked up by the character can not be harvested again until a predetermined time elapses.

16. The game device of claim 14, wherein when the character eats a poisonous plant, the index representing the state of health of the character is reduced.

17. The game device of claim 15, further comprising a third control unit which detects a time in the game when the plant is picked up by the character, and reproduces and displays the plant after the predetermined time elapses from the time when the plant is picked up.

18. A recording medium readable by a computer, tangibly embodying a program of instructions executable by the computer to play a game in which a player manipulates a main character, and the character lives in an inhabited island alone with acquiring knowledge to survive, the program comprising the steps of:

storing a plurality of images each of which represents a food;

preparing a command which instructs to pick up the food;

storing a time when the food is picked up;

changing a state of the food when the character eats a food a predetermined time later from the stored time; and associating the state of the food with a slate of health of the character.

19. The recording medium of claim 18, wherein a plurality of images representing animals are stored, the animals are caught by selecting a command to hunt the animals, and the state of health of the character in the game is changed according to whether the character selects a processing command instructing to process the caught animals or not.

20. A recording medium readable by a computer, tangibly embodying a program of instructions executable by the computer to play a game in which a player manipulates a character and, through the game, the player experiences virtual actions relating to a matter of life and death in connection to the character, the program comprising the steps of:

preparing parameters which influences upon the matter of life and death; and increasing or decreasing values of the parameters as time in a game space goes by, wherein the step of increasing or decreasing changes the value of the parameters in response to actions of the character and the parameters comprises a first group parameters including a degree of fullness of the character's stomach, an intake of water, and a degree of tiredness.

21. The recording medium of claim 20, wherein the program reduces a life point which represents a state relating to the matter of life and death when at least one parameter of the first group parameters reaches to a predetermined limit value.

22. The recording medium of claim 21, wherein the limit values about the parameters representing the degree of fullness of the character's stomach and the intake of water are set to zero, and the limit value of the parameter representing the degree of tiredness is set to 100.

23. The recording medium of claim 20, wherein the program provides use of a processing command instructing to roast a piece of meat of the animal.

24. The recording medium of claim 23, wherein the program reduces an index representing the state of health of the main character when the character eats the piece of meat without selecting of the processing command by the player.

25. The recording medium of claim 20, wherein the program represents that the piece of meat is rotted as time elapses, and reduces the index representing the state of health of the character when the character eats the rotted meat.

26. The recording medium of claim 23, wherein the program issues the processing command after a tool to fire used for roasting the piece of meat of the animal is selected.

27. The recording medium of claim 26, wherein the program produces the tool to fire when the player instructs to combine predetermined items.

* * * * *